United States Patent Office 3,069,394
Patented Dec. 18, 1962

3,069,394
STABLE POLYMERS OF VINYL CHLORIDE AND UNSATURATED ORGANOTIN COMPOUNDS
Gerry P. Mack, Jackson Heights, N.Y., assignor to Metal & Thermit Corporation, Woodbridge Township, N.J., a corporation of New Jersey
No Drawing. Filed Oct. 16, 1959, Ser. No. 846,796
19 Claims. (Cl. 260—78.5)

The present invention relates to novel synthetic polymeric compositions characterized by their rigid, tough properties and improved stability to light and heat. More particularly, the present invention relates to novel copolymeric compositions of vinyl chloride with organotin compounds. The process whereby such copolymeric compositions are made also constitutes a part of this invention.

It is well known that the homopolymerization of vinyl chloride produces hard, horny resins that are characteristically difficult to work and are thermally and actinically unstable. The workability of such resins is improved by copolymerization of the vinyl chloride with other unsaturated monomers and/or by the addition of plasticizers to the resinous materials. However, so far as I am aware, neither practice overcomes the foregoing difficulties and other disadvantages, since copolymerization generally results in the loss of desirable physical properties, and the use of relatively large amounts of plasticizers is undesirable, especially in the production of so-called rigid formulations. Furthermore, the copolymerized or plasticized resins still exhibit the sensitivity of the homopolymer to heat and light which manifests itself in the distortion and discoloration of articles produced from the resinous material. In order to overcome the heat and light instability of these resins, it has generally been the practice in the past to incorporate in the resin during the calendering, molding or other heat-treatment step a small amount of a heat and/or light stabilizing material. Many types of stabilizers have been employed, including certain organotin compounds. This method of combating the instability problem, i.e., by physically intermixing a stabilizer with the resinous material, has obvious disadvantages. It necessitates the handling and stock-piling of separate materials, the accurate measurement of small amounts of stabilizer, and an adequate mixing process to uniformly disperse the stabilizing ingredient throughout the resin. Also, an additional problem often arises from the use of physically-incorporated stabilizing materials. The stabilizers frequently exhibit a tendency to exude or bloom from the resin during the heat-treating operations, resulting in unsightly and often useless finished products. I have now discovered copolymeric compositions of vinyl chloride, and methods of making the same, which not only retain many of the desirable physical properties of vinyl chloride homopolymeric resins, but which also provide a stabilizing ingredient chemically bound within the lattices of the polymer molecule.

It is an object of the present invention to provide a rigid, tough vinyl chloride copolymer.

It is another object of the present invention to provide vinyl chloride copolymers which exhibit superior thermal and light stability.

It is still another object of the present invention to provide a vinyl chloride copolymer containing a stabilizing ingredient chemically-bound within the polymer molecule.

It is a further object of the present invention to provide a method of producing a rigid, tough copolymer of vinyl chloride containing a chemically-bound ingredient which improves the heat and light stability characteristics of the copolymer.

Other objects will be apparent to those skilled in the art from the following description of the invention.

Broadly speaking, the present invention provides a thermoplastic composition comprising a major proportion of vinyl chloride copolymerized with a hydrocarbontin ester of an α,β-ethylenically unsaturated monocarboxylic acid and with a stabilizing amount of an organotin compound having at least one vinyl group bonded directly to the tin atom. The novel compositions of this invention are produced by copolymerizing the vinyl chloride, hydrocarbontin ester and organovinyltin compound.

The hydrocarbontin esters of α,β-unsaturated acids contemplated in the present invention are those having the general formula

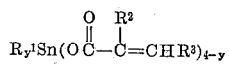

wherein $R^1$ and $R^3$ are monovalent hydrocarbon radicals such as alkyl, aryl, cycloalkyl, aralkyl, etc., preferably having no more than 20 carbon atoms, $R^2$ is selected from the class consisting of hydrogen and lower alkyl radicals, preferably having no more than 6 carbon atoms, and $y$ is an integer from 1 to 3. Such hydrocarbontin esters are prepared by reacting alkali-metal salts of the α,β-unsaturated acids with the appropriate hydrocarbontin halides, by reacting the free acids with the hydrocarbontin oxides or hydroxides, or by other suitable methods.

The above general formula of the hydrocarbontin esters provides for compounds having from one to three acid residues. Correspondingly, the number of hydrocarbon groups bonded to the tin atom may vary from one to three. Furthermore, the acid residues may be derived from an α,β-unsaturated acid such as acrylic acid, methacrylic acid, cinnamic acid or similar acids wherein one of the β-hydrogens of acrylic acid is replaced by a hydrocarbon group. All the various permutations of the above formula are suitable in the present invention; however, the alkyltin esters of acrylic and methacrylic acids are especially preferred since of the various esters within the scope of the invention, these are the most readily obtained from presently available materials.

It is also contemplated that mixtures of compounds characterized by the above formula may be utilized in the compositions and processes of this invention. Obviously, the choice of particular hydrocarbontin esters will depend on the proposed use and desired properties of the final resin. For example, the number and choice of $R^1$ groups will affect the hardness and workability of the resin. Similarly, selection of the acid residue will affect the toughness of the final product. By suitable selection of the hydrocarbon groups bonded to the tin atom and those of the acid residue, or by utilizing mixtures of different hydrocarbontin esters, copolymers having intermediate physical characteristics are obtained. Various degrees of toughness, hardness and/or elasticity can be obtained also by varying the proportions of hydrocarbontin ester to the vinyl chloride monomer. As previously stated, the final copolymeric compositions contemplated by the invention contain a major proportion of vinyl chloride, i.e., greater than 50% by weight of the resin. Although lesser amounts may be employed, the hydrocarbontin ester is generally at least 5% by weight of the resin; preferably 10% to 30% of the hydrocarbontin ester is employed.

The organovinyltin compounds of the copolymeric compositions of the invention impart thermal and light stability to the resins. These compounds are characterized as tetravalent tin compounds having at least one vinyl group bonded directly to the tin atom and having the general formula:

$$Vi_nR_aR'_bR''_cSnX_{4-(n+a+b+c)}$$

wherein Vi is a vinyl group, R, R', and R'' are aryl, aralkyl, alkaryl or alkyl groups, X is an anion including halogen, alkoxy, aryloxy, thiocarboxylate and carboxylate groups, etc., $n$ is a whole number from 1 to 4 and $a$, $b$ and $c$ are small whole numbers from 0 to 3, totaling not more than 3. Included among these compounds are: divinyltin dichloride, butylvinyltin dichloride, tributylvinyltin, trivinyltin chloride, vinyltin trichloride, dibutylvinyltin bromide, dibutylvinyltin chloride, tetravinyltin, butyldivinyltin chloride, benzyldivinyltin chloride, o-tolyldivinyltin chloride, tricyclopentadienylvinyltin, dicyclopentadienylvinyltin chloride, divinyltin diiodide, dibutyldivinyltin, triphenylvinyltin, diphenyldivinyltin, divinyltin-S,S'-bis(isooctylmercaptoacetate), vinylbutyltin dilaurylmercaptide, vinylbutyltin-S,S'-bis(isooctylmercaptoacetate), divinyltin dilaurate, divinyltin maleate, butylvinyltin bis(monomethylmaleate), divinyltin dimethoxide, divinyltin dibutoxide, etc.

The type of organovinyltin compound copolymerized with the vinyl chloride and alkyltin esters influences to some extent the properties of the final composition. For example, organovinyltin compounds having more than one vinyl group directly bonded to the tin atom act as cross-linking agents, and hence, tend to give harder, less-flexible resins. The properties, especially the heat and light stability of the resins, are also affected by the amount of organovinyltin compound employed. While varying amounts may be used, it has been found between 0.25 and 10 percent by weight of the resin is satisfactory, while for best results, it is desirable to employ between about 1 and 5 percent organvinyltin compound.

The stable copolymeric resins of the invention are produced by polymerizing the vinyl chloride monomer while in intimate mixture with the alkyltin ester and organovinyltin compounds. A copolymer thereby results wherein units derived from these materials are chemically bonded in the resin. Conventional polymerization techniques may be advantageously employed; however, emulsion polymerization techniques are preferred since the copolymeric compositions of the invention form smoothly and readily in such systems. Nonionic emulsifiers or types such as polyvinyl alcohol are suitable in the process of the invention. Preferably, a polymerization catalyst and temperatures of the order of 30° to 80° C. are employed to accelerate the polymerization reaction. Among the suitable catalysts are the so-called peroxy catalysts, such as the organic peroxides, including benzoyl peroxide, lauroyl peroxide, tertiary alkyl peroxides, di(tertiary alkyl) peroxides; per-salts such as the alkali-metal persulfates, including potassium persulfate, etc.; and other free-radical catalysts with which those skilled in the art are familiar. The amount of catalyst employed is somewhat dependent upon the rate of polymerization desired and the temperature at which the polymerization is run; however, 0.10% by weight of the resin is generally suitable. Preferred amounts of catalyst are of the order of 0.20% to 0.30%, since with these amounts the polymerization proceeds smoothly at about the same rate as is typical of other vinyl chloride copolymerization systems.

For the purpose of giving those skilled in the art a better understanding of the invention, the following illustrative examples are given.

*Example 1*

Two hundred grams of a 0.125% solution of polyvinyl alcohol (Du Pont Elvanol 50–52 grade) in distilled water was placed into a 7 oz. soda bottle, and thereafter, 27 g. of tributyltin methacrylate and 3 g. of triphenylvinyltin. The bottle was chilled in a Dry Ice bath until the contents were frozen, and then 70 g. of vinyl chloride and 0.25 g. of lauoryl peroxide were added. The bottle was immediately capped, and then placed on a rotating wheel in a bath maintained at 50° C. After rotating at this temperature for about 20 hours, the bottle was removed from the bath, chilled and opened. The suspension of copolymer thus obtained was filtered, washed with methanol and dried under a vacuum at 45–50° C. A hard, off-white, tin-containing crystalline resin was obtained.

*Example 2*

The procedure and formulation of Example 1 were followed except divinyltin-S,S'-bis(isooctylmercaptoacetate) was used in place of triphenylvinyltin. A crystalline resin having a tin content of 16.2% was obtained.

*Example 3*

The procedure and formulation of Example 1 were followed except butylvinyltin bis(lauryl mercaptide) was used in place of triphenylvinyltin. The resin obtained had a tin content of 17.8%.

*Example 4*

The procedure and formulation of Example 1 were followed except butylvinyltin S,S'-(isooctylmercaptoacetate) was used in place of triphenylvinyltin. The hard off-white resin had a tin content of 23.3%

*Example 5*

Following the procedure of Example 1, 87 g. of vinyl chloride, 10 g. of tributyltin methacrylate and 3 g. of butylvinyltin bis(monomethylmaleate) were copolymerized to obtain a resin having 4.15% tin.

*Example 6*

The formulation of Example 5 was followed except that dibutyltin bis methacrylate was used in place of the tributyltin methacrylate. The resin obtained had a tin content of 3.87%.

*Example 7*

Following the procedure and formulation of Example 1, vinyl chloride, diphenyltin bis acrylate and di-o-tolylvinyltin 2-ethylhexoate are copolymerized to give a hard, off-white tin-containing resin.

*Example 8*

Following the procedure and formulation of Example 1, vinyl chloride, tributyltin cinnamate and benzylvinyltin dibutoxide are copolymerized to obtain a crystalline, tin-containing resin.

*Example 9*

Following the formulation of Example 5, vinyl chloride, cyclohexyltin tris methacrylate, and divinyltin diphenoxide are copolymerized. A crystalline resin containing tin is produced.

*Example 10*

Tributyltin acrylate is used in place of tributyltin methacrylate in the formulation and procedure of Example 1. A crystalline tin-containing resin is obtained.

*Example 11*

Benzyltin tris acrylate is used in place of tributyltin methacrylate and tetravinyltin in place of the triphenylvinyltin in the procedure and formulation of Example 1. A tin-containing resin is produced.

*Example 12*

The procedure and formulation of Example 5 is followed except that dilauryltin bis methacrylate is used in place of tributyltin methacrylate and divinyltin dichloride is used in place of butylvinyltin bis(monomethylmaleate). An off-white, crystalline resin containing tin is obtained.

Example 13

The procedure and formulation of Example 5 is followed except that dioctyltin bis(β-cyclohexylacrylate) is used in place of tributyltin methacrylate. A hard crystalline resin containing tin is produced.

Clear sheets of the heat and light stable copolymers of the present invention are obtained by placing the resins between the platens of a single cavity mold, and subjecting them to 40,000 p.s.i. at 163° C. for about 2½ minutes.

As will be apparent to those skilled in the art, other organovinyltin compounds may be employed in the foregoing examples. Among those which are suitable are butylvinyltin dichloride, tributylvinyltin, trivinyltin chloride, vinyltin trichloride, dibutylvinyltin bromide, dibutylvinyltin chloride, butyldivinyltin chloride, benzyldivinyltin chloride, o-tolyldivinyltin chloride, tricyclopentadienylvinyltin, dicyclopentadienylvinyltin chloride, divinyltin diiodide, dibutyldivinyltin, divinyltin dilaurate, divinyltin maleate, divinyltin dimethoxide and divinyltin dibutoxide.

Among other polymerization catalysts which may be employed in the foregoing examples are benzoyl peroxide, tertiary butyl peroxide, ditertiary butyl peroxide, potassium persulfate, sodium persulfate, azo-bis(isobutyronitrile), etc.

The novel copolymeric compositions of the present invention may be used in any of the known applications of vinyl chloride homopolymers and copolymers. They are especially useful in the production of clear polymeric sheets, packaging films, tubing and other articles of manufacture, particularly where toughness, durability, and heat and light stability are required.

The terms and expresions which have been employed herein are used as terms of description and not of limitation, and there is no intention in the use of such terms and expressions of excluding any equivalents of the features shown and described or portions thereof, but it is recognized that various modifications are possible within the scope of the appended claims.

What I claim is:

1. A tough stable three-component copolymer resin comprising
   at least 50 parts of vinyl chloride;
   at least 5 parts by weight of a hydrocarbontin ester having the formula $R^*_y SnA_{4-y}$ wherein $R^*$ is selected from monovalent radicals from the group consisting of alkyl radicals, aryl radicals, cycloalkyl radicals, and aralkyl radicals, A is the acid moiety of an α,β-ethylenically unsaturated acid; and $y$ is an integer from 1-3; and
   from 0.25 to 10 parts of an organotin compound having the formula $Vi_n(R_a)(R'_b)(R''_c)SnX_{4-(n+a+b+c)}$, wherein Vi is the vinyl radical, R, R', and R'' are selected from the group consisting of alkyl radicals, aralkyl radicals, alkaryl radicals, and aryl radicals, X is an anion selected from the group consisting of halogens, alkoxy radicals, aryloxy radicals, thiocarboxylate radicals, carboxylate radicals, and mercaptide radicals, $n$ is an integer from 1-4, and $a$, $b$, and $c$, are integers from 0-3, the sum of $a$, $b$ and $c$ totalling not more than 3;
   wherein all parts are expressed per 100 parts by weight of resin.

2. A tough, stable three-component copolymer resin comprosing a major amount of vinyl chloride, at least 5 parts of an alkyltin ester selected from the class consisting of alkyltin acrylates and alkyltin methacrylates, and with from 0.25 to 10 parts of a tetravalent organotin compound having the formula $$Vi_n(R_a)(R'_b)(R''_c)SnX_{4-(n+a+b+c)}$$

wherein Vi is the vinyl radical, R, R', and R'' are selected from the group consisting of alkyl radicals, aralkyl radicals, alkaryl radicals, and aryl radicals, X is an anion selected from the group consisting of halogens, alkoxy radicals, aryloxy radicals, thiocarboxylate radicals, carboxylate radicals, and mercaptide radicals, $n$ is an integer from 1-4 and $a$, $b$, and $c$ are integers from 0-3, the sum of $a$, $b$, and $c$ totalling not more than 3, wherein all parts are expressed per 100 parts by weight of the resin.

3. A tough, stable three-component copolymer resin according to claim 2 wherein the alkyltin ester is tributyltin methacrylate.

4. A tough, stable three-component copolymer resin comprising from about 65 to 84 parts by weight of vinyl chloride, 10 to 30 parts by weight of an alkyltin ester selected from the class consisting of alkyltin acrylates and alkyltin methacrylates, and from about 1 to 5 parts by weight of a tetravalent organotin compound having the formula $Vi_n(R_a)(R'_b)(R''_c)SnX_{4-(n+a+b+c)}$, wherein Vi is the vinyl radical, R, R', and R'' are selected from the group consisting of alkyl radicals, aralkyl radicals, alkaryl radicals, and aryl radicals, X is an anion selected from the group consisting of halogens, alkoxy radicals, aryloxy radicals, thiocarboxylate radicals, carboxylate radicals, and mercaptide radicals, $n$ is an integer from 1-4 and $a$, $b$, and $c$ are integers from 0-3, the sum of $a$, $b$, and $c$ totalling not more than 3.

5. A tough, stable three-component copolymer according to claim 4 wherein the alkyltin ester is tributyltin acrylate.

6. A tough, stable three-component copolymer according to claim 4 wherein the alkyltin ester is tributyltin methacrylate.

7. A tough, stable three-component copolymer according to claim 6 wherein the organovinyltin compound is divinyltin-S,S'-bis(isooctylmercaptoacetate).

8. A tough, stable three-component copolymer according to claim 6 wherein the organovinyltin compound is butylvinyltin bis(lauryl mercaptide).

9. A tough, stable three-component copolymer according to claim 6 wherein the organovinyltin compound is butylvinyltin-S,S'-bis(isoocylmercaptoacetate).

10. A tough, stable three-component copolymer according to claim 6 wherein the organovinyltin compound is butylvinyltin bis(monomethylmaleate).

11. A method of producing a tough, stable, three-component copolymer resin which comprises polymerizing
    at least 50 parts of vinyl chloride in intimate contact with
    at least 5 parts by weight of a hydrocarbontin ester having the formula $R^*_y SnA_{4-y}$ wherein $R^*$ is selected from monovalent radicals from the group consisting of alklyl radicals, aryl radicals, cycloalkyl radicals, and aralkyl radicals, A is the acid moiety of α,β-ethylenically unsaturated acid, and $y$ is an integer from 1-3, and with
    from 0.25 to 10 parts of an organotin compound having the formula $Vi_n(R_a)(R'_b)(R''_c)SnX_{4-(n+a+b+c)}$, wherein Vi is the vinyl radical, R, R', and R'' are selected from the group consisting of alkyl radicals, aralkyl radicals, alkaryl radicals, and aryl radicals, X is an anion selected from the group consisting of halogens, alkoxy radicals, aryloxy radicals, thiocarboxylate radicals, carboxylate radicals, and mercaptide radicals, $n$ is an integer from 1-4, and $a$, $b$, and $c$ are integers from 0-3, the sum of $a$, $b$, and $c$ totalling not more than 3,
    wherein all parts are expressed per 100 parts by weight of resin; the polymerization being carried out in the presence of a free radical polymerization catalyst at a temperature of about 30° C. to 80° C.

12. A method of producing a tough, stable three-component copolymer resin which comprises polymerizing a major amount of vinyl chloride in intimate contact with at least 5 parts by weight of an alkyltin ester selected from the class consisting of alkyltin acrylates and alkyltin methacrylates and with from 0.25 to 10 parts by weight of a tetravalent organotin compound having the formula $$Vi_n(R_a)(R'_b)(R''_c)SnX_{4-(n+a+b+c)}$$

wherein Vi is the vinyl radical, R, R', and R" are selected from the group consisting of alkyl radicals, aralkyl radicals, alkaryl radicals, and aryl radicals, X is an anion selected from the group consisting of halogens, alkoxy radicals, aryloxy radicals, thiocarboxylate radicals, carboxylate radicals, and mercaptide radicals, $n$ is an integer from 1–4, and $a$, $b$, and $c$ are integers from 0–3, the sum of $a$, $b$, and $c$ totalling not more than 3; wherein all parts are expressed per 100 parts by weight of the resin, the polymerization being carried out in the presence of a free radical polymerization catalyst at a temperature of about 30° C. to 80° C.

13. A method of producing a tough, stable three-component copolymer resin which comprises polymerizing 65 to 84 parts by weight of vinyl chloride while in intimate contact with 10 to 30 parts by weight of alkyltin esters selected from the class consisting of alkyltin acrylates and alkyltin methacrylates and with 1 to 5 parts by weight of a tetravalent organotin compound having the formula $Vi_n(R_a)(R'_b)(R''_c)SnX_{4-(n+a+b+c)}$, wherein Vi is the vinyl radical, R, R', and R" are selected from the group consisting of alkyl radicals, aralkyl radicals, alkaryl radicals, and aryl radicals, X is an anion selected from the group consisting of halogens, alkoxy radicals, aryloxy radicals, thiocarboxylate radicals, carboxylate radicals, and mercaptide radicals, $n$ is an integer from 1–4, and $a$, $b$, and $c$ are integers from 0–3, the sum of $a$, $b$, and $c$ totalling not more than 3; the polymerization being carried out in the presence of a free radical polymerization catalyst at a temperature of about 30° C. to 80° C.

14. A method according to claim 13 wherein the alkyltin ester is tributyltin acrylate.

15. A method according to claim 13 wherein the alkyltin ester is tributyltin methacrylate.

16. A method according to claim 15 wherein the organovinyltin compound is divinyltin-S,S'-bis(isooctylmercaptoacetate).

17. A method according to claim 15 wherein the organovinyltin compound is butylvinyltin bis(lauryl mercaptide).

18. A method according to claim 15 wherein the organovinyltin compound is butylvinyltin-S,S'-bis(isooctylmercaptoacetate).

19. A method according to claim 15 wherein the organovinyltin compound is butylvinyltin bis(monomethylmaleate).

References Cited in the file of this patent

UNITED STATES PATENTS

| | | |
|---|---|---|
| 2,253,128 | Langkammerer | Aug. 19, 1941 |
| 2,318,959 | Muskat et al. | May 11, 1943 |
| 2,832,750 | Weinberg et al. | Apr. 29, 1958 |
| 2,873,288 | Rosenberg | Feb. 10, 1959 |